(12) United States Patent
Lin

(10) Patent No.: US 7,587,783 B1
(45) Date of Patent: Sep. 15, 2009

(54) WINDSHIELD WIPER

(76) Inventor: Chin-Lien Lin, 9, Lane 120, Sec.3, Chung Ching North Rd., Taipei (TW)

( * ) Notice: Subject to any disclaimer, the term of this patent is extended or adjusted under 35 U.S.C. 154(b) by 861 days.

(21) Appl. No.: 11/189,997

(22) Filed: Jul. 26, 2005

(51) Int. Cl.
*B60S 1/38* (2006.01)
*B60S 1/40* (2006.01)

(52) U.S. Cl. .............................. 15/250.43; 15/250.201; 15/250.32

(58) Field of Classification Search ............ 15/250.201, 15/250.43, 250.451, 250.32, 250.44, 250.361
See application file for complete search history.

(56) References Cited

U.S. PATENT DOCUMENTS

| | | | | | |
|---|---|---|---|---|---|
| 3,390,416 | A | * | 7/1968 | Scinta | 15/250.32 |
| 6,161,248 | A | * | 12/2000 | Merkel et al. | 15/250.32 |
| 6,668,419 | B1 | * | 12/2003 | Kotlarski | 15/250.43 |
| 7,263,741 | B2 | * | 9/2007 | Genet et al. | 15/250.32 |
| 7,293,321 | B2 | * | 11/2007 | Breesch | 15/250.201 |
| 2004/0098821 | A1 | * | 5/2004 | Kraemer et al. | 15/250.201 |
| 2005/0039292 | A1 | * | 2/2005 | Boland | 15/250.32 |

FOREIGN PATENT DOCUMENTS

DE 10044913 * 12/2001

* cited by examiner

*Primary Examiner*—Gary K Graham
(74) *Attorney, Agent, or Firm*—Alan Kamrath; Kamrath & Associates PA

(57) ABSTRACT

A windshield wiper includes a connecting seat, two elastic plates, a wiper, two rubber protective hoods, two side covers, a shelter, and a connecting block. Thus, each of the elastic plates is snapped into the respective snapping plate of the connecting seat so that each of the elastic plates is mounted in the connecting seat in a snapping manner without needing the riveting process. In addition, each of the side covers has two locking posts each locked in the locking hole of each of the elastic plates so that each of the side covers is mounted on the elastic plates closely without needing an adhesive.

16 Claims, 7 Drawing Sheets

US 7,587,783 B1

WINDSHIELD WIPER

BACKGROUND OF THE INVENTION

1. Field of the Invention

The present invention relates to a windshield wiper, and more particularly to a windshield wiper having a simplified manufacturing process without needing riveting and bonding actions.

2. Description of the Related Art

A conventional windshield wiper 10 in accordance with the prior art shown in FIGS. 8 and 9 comprises a steel plate 11 including an axially extended fixing slot 111 having an end formed with an enlarged opening 112, a wiper 15 mounted in the fixing slot 111 of the steel plate 11, two protective hoods 13 each mounted on one of two ends of the steel plate 11 and having a mounting hole 131 mounted on the steel plate 11, two side covers 14 each mounted on the respective end of the steel plate 11 and each rested on the respective protective hood 13, and an articulation 12 mounted on the steel plate 11 and located between the two protective hoods 13. The steel plate 11 has a mediate portion formed with a plurality of rivet holes 113, and the articulation 12 has an upper portion provided with a shaft 121 for mounting a motor (not shown) and a lower portion formed with a plurality of fixing posts 122 secured in the rivet holes 113 of the steel plate 11 by riveting.

In assembly, the articulation 12 has a plurality of fixing posts 122 secured in the rivet holes 113 of the steel plate 11 by riveting. Then, the wiper 15 is inserted into the enlarged opening 112 of the steel plate 11 and locked in the fixing slot 111 of the steel plate 11 in a sliding manner. Then, the two protective hoods 13 are mounted on the steel plate 11. Finally, the two side covers 14 are mounted on the steel plate 11 and each bonded on the respective protective hood 13 by an adhesive.

However, the articulation 12 is secured to the steel plate 11 by riveting, so that it is difficult to mount the articulation 12 on the steel plate 11, thereby causing inconvenience in assembly of the windshield wiper and wasting the manual work. In addition, each of the two side covers 14 is bonded on the respective protective hood 13 by an adhesive, thereby complicating the manufacturing process, and decreasing the productivity of the windshield wiper. Further, each of the two side covers 14 is bonded on the respective protective hood 13 by an adhesive, so that each of the two side covers 14 is easily detached from the respective protective hood 13 during a long-term utilization. Further, the articulation 12 is directly exposed outward from the steel plate 11, thereby decreasing the aesthetic quality of the windshield wiper.

SUMMARY OF THE INVENTION

In accordance with the present invention, there is provided a windshield wiper, comprising a connecting seat, two elastic plates, and a wiper. The connecting seat has a lower portion having two sides each formed with a snapping plate having an inner side having a mediate portion formed with a locking block. The connecting seat has a bottom having two sides each formed with at least one insertion block spaced from the locking block. Each of the two elastic plates is mounted in the respective snapping plate of the connecting seat and has a mediate portion having a first side formed with a locking recess for mounting the locking block of the respective snapping plate of the connecting seat and a second side formed with at least one insertion recess to allow insertion of the at least one insertion block of the connecting seat. The wiper is mounted between the two elastic plates.

The primary objective of the present invention is to provide a windshield wiper having a simplified manufacturing process without needing riveting and bonding actions.

Another objective of the present invention is to provide a windshield wiper, wherein each of the two elastic plates is snapped into the respective snapping plate of the connecting seat so that each of the two elastic plates is mounted in the connecting seat in a snapping manner without needing the riveting process, thereby greatly facilitating assembly of the windshield wiper and saving the manual work.

A further objective of the present invention is to provide a windshield wiper, wherein each of the two side covers has two locking posts each inserted into and locked in the locking hole of each of the two elastic plates so that each of the two side covers is mounted on the two elastic plates closely without needing an adhesive, thereby simplifying the manufacturing process, and enhancing the productivity of the windshield wiper.

A further objective of the present invention is to provide a windshield wiper, wherein each of the two side covers is positioned on the two elastic plates exactly, thereby preventing each of the two side covers from being detached from the two elastic plates during a long-term utilization.

A further objective of the present invention is to provide a windshield wiper, wherein the shelter is mounted around the periphery the connecting seat to enhance the aesthetic quality of the windshield wiper.

Further benefits and advantages of the present invention will become apparent after a careful reading of the detailed description with appropriate reference to the accompanying drawings.

DETAILED DESCRIPTION OF THE INVENTION

Figure 1:
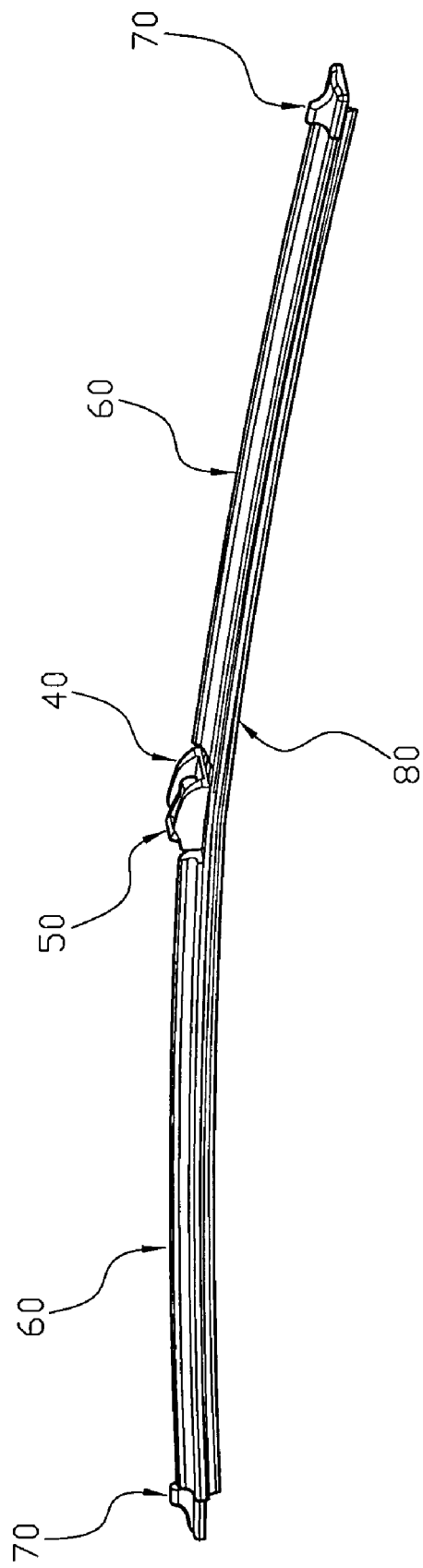
FIG. 1 is a perspective view of a windshield wiper in accordance with the preferred embodiment of the present invention.
Figure 2:
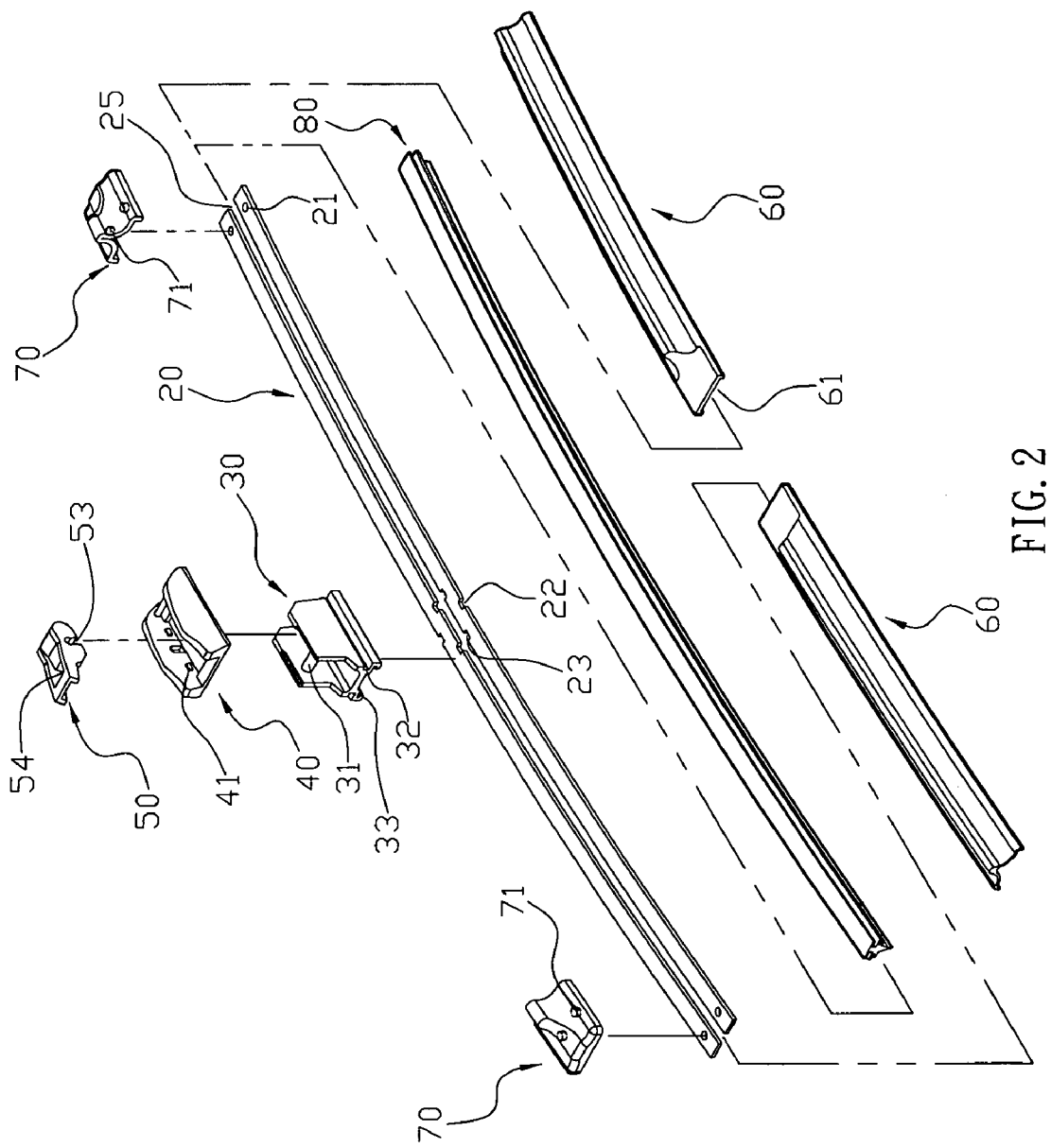
FIG. 2 is an exploded perspective view of the windshield wiper as shown in FIG. 1.
Figure 3:
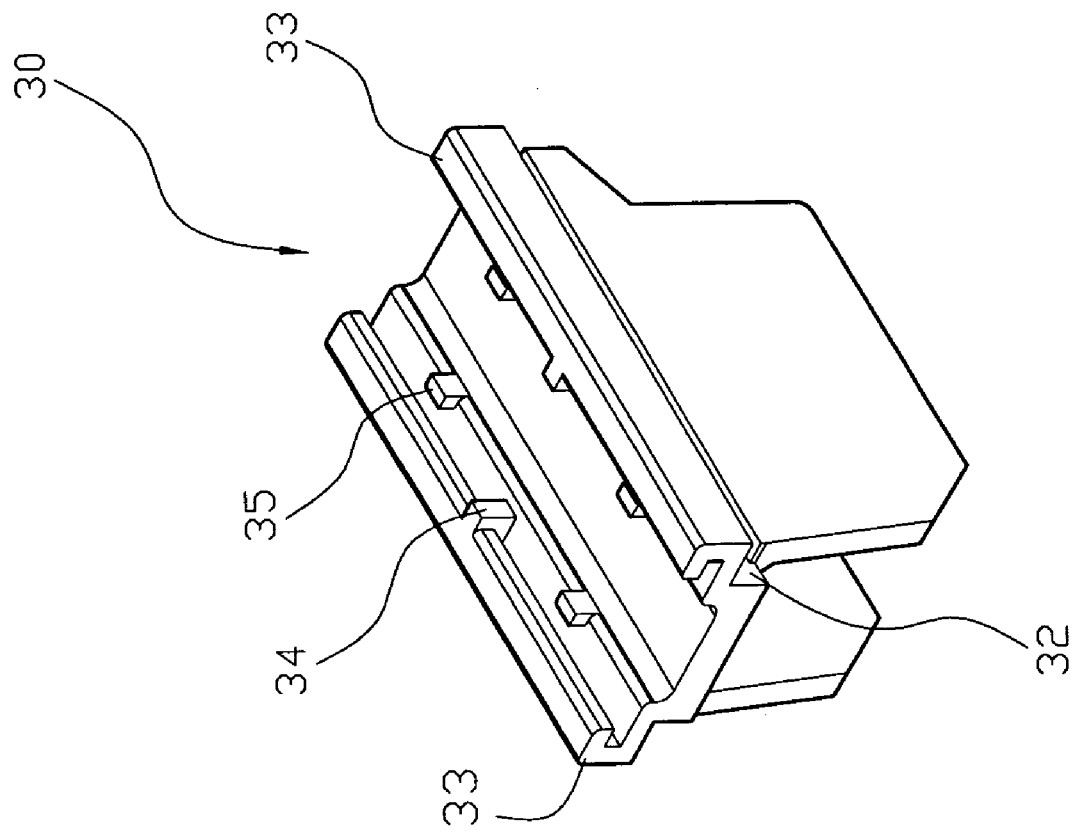
FIG. 3 is a perspective view of a connecting seat of the windshield wiper as shown in FIG. 1.
Figure 7:
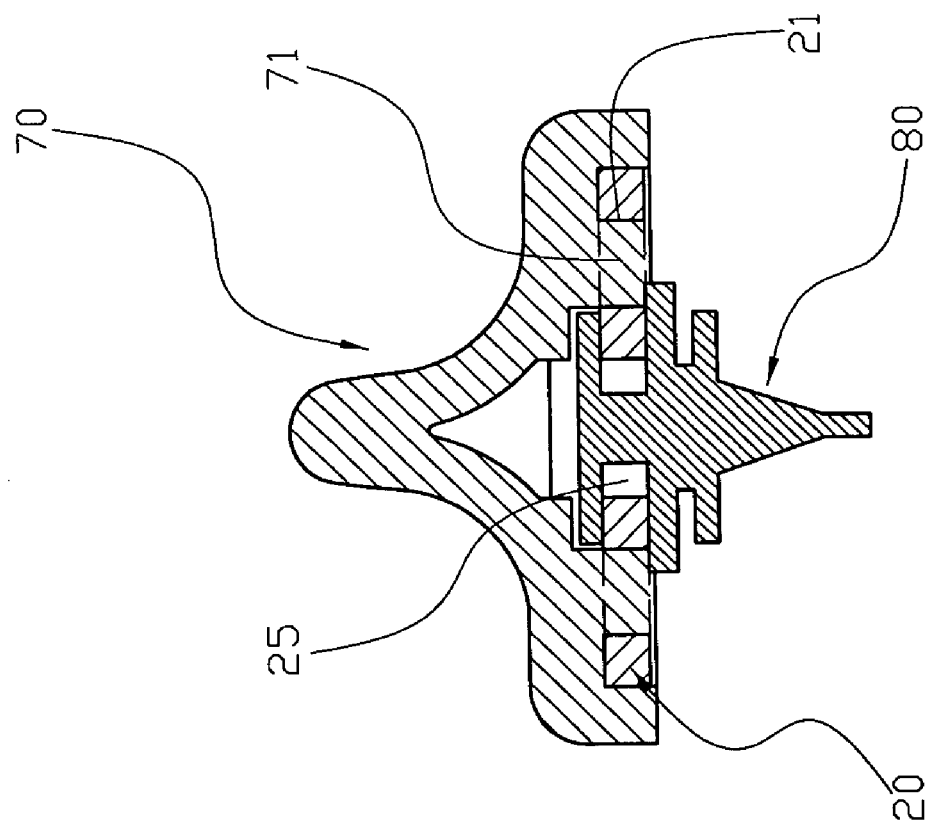
FIG. 7 is a partially plan cross-sectional view of the windshield wiper as shown in FIG. 1.
Figure 4:
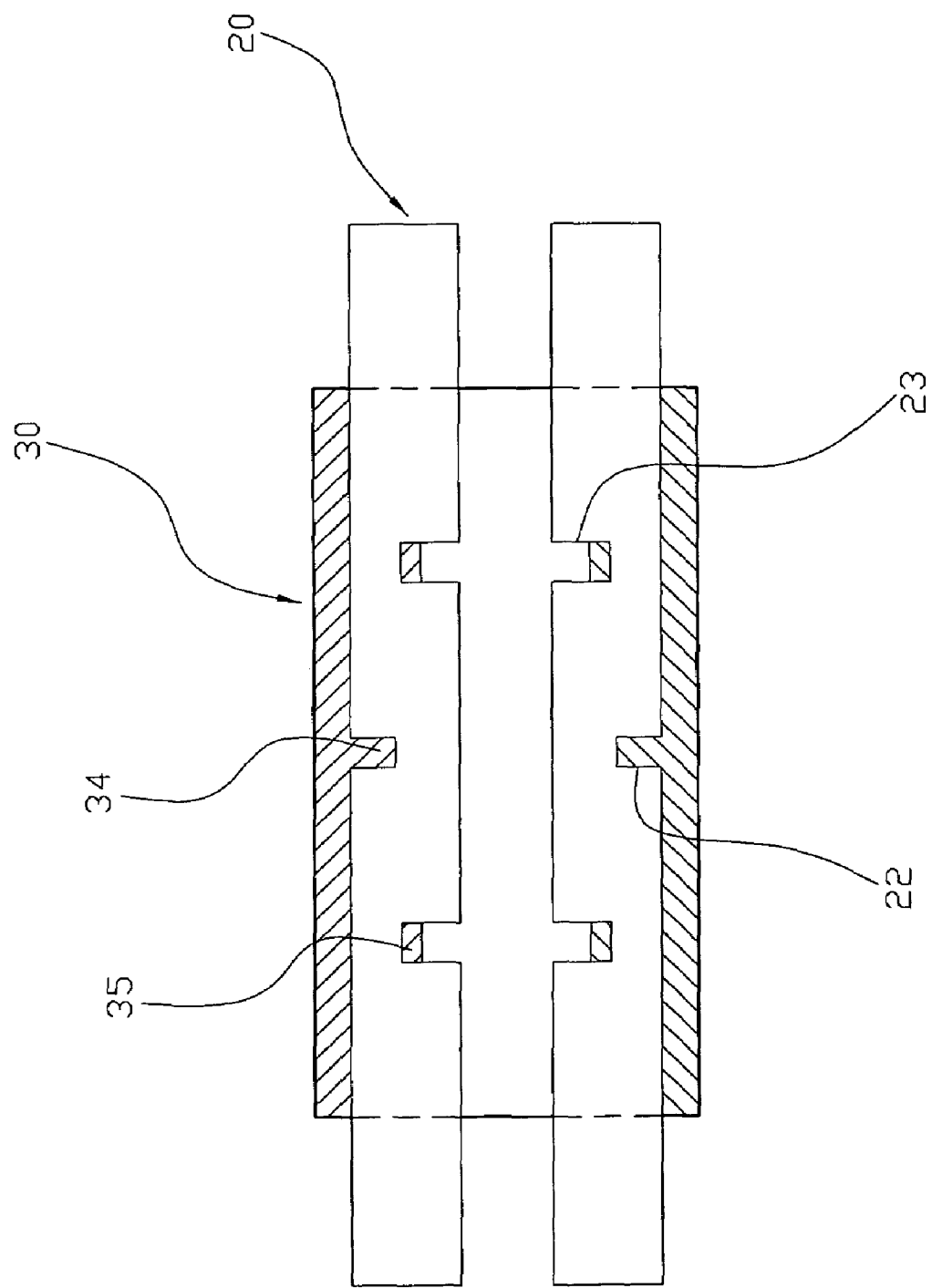
FIG. 4 is a partially plan cross-sectional view of the windshield wiper as shown in FIG. 1.
Figure 5:
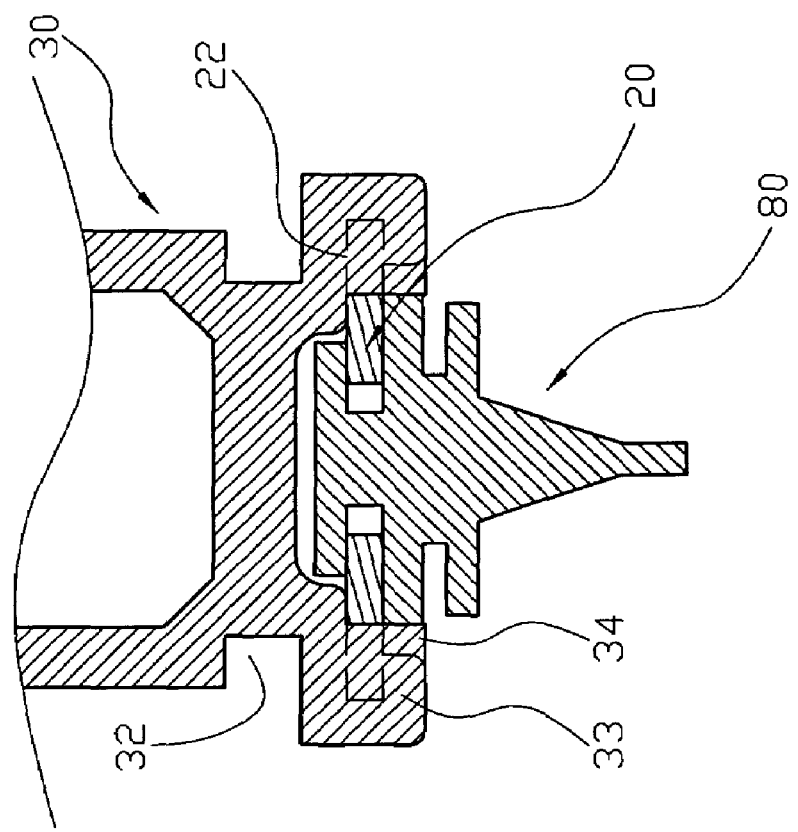
FIG. 5 is a partially plan cross-sectional view of the windshield wiper as shown in FIG. 1.
Figure 6:
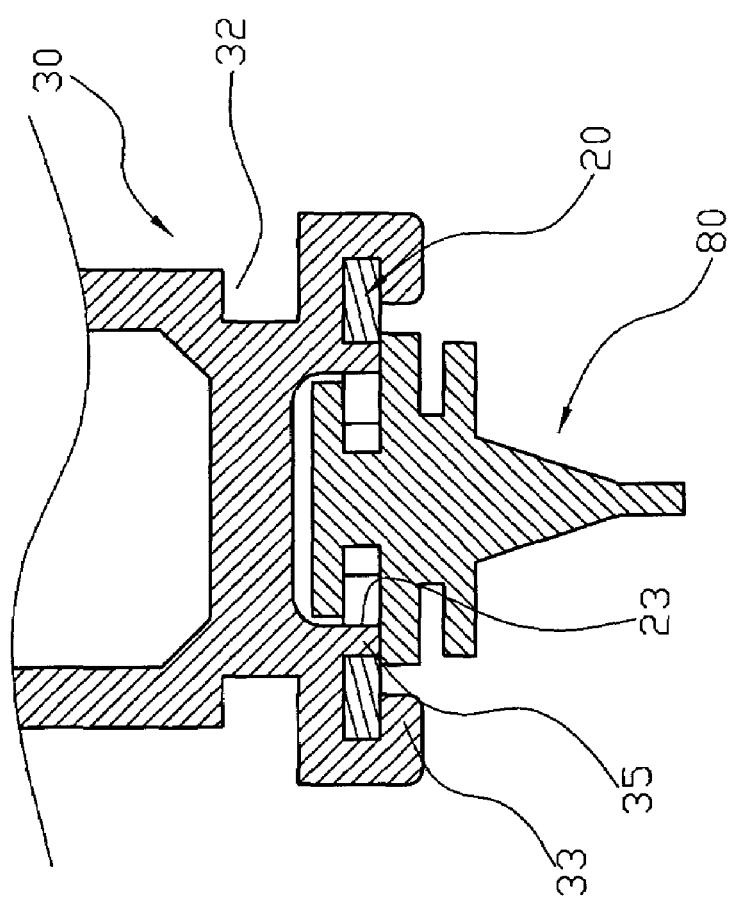
FIG. 6 is a partially plan cross-sectional view of the windshield wiper as shown in FIG. 1.
Figure 8:
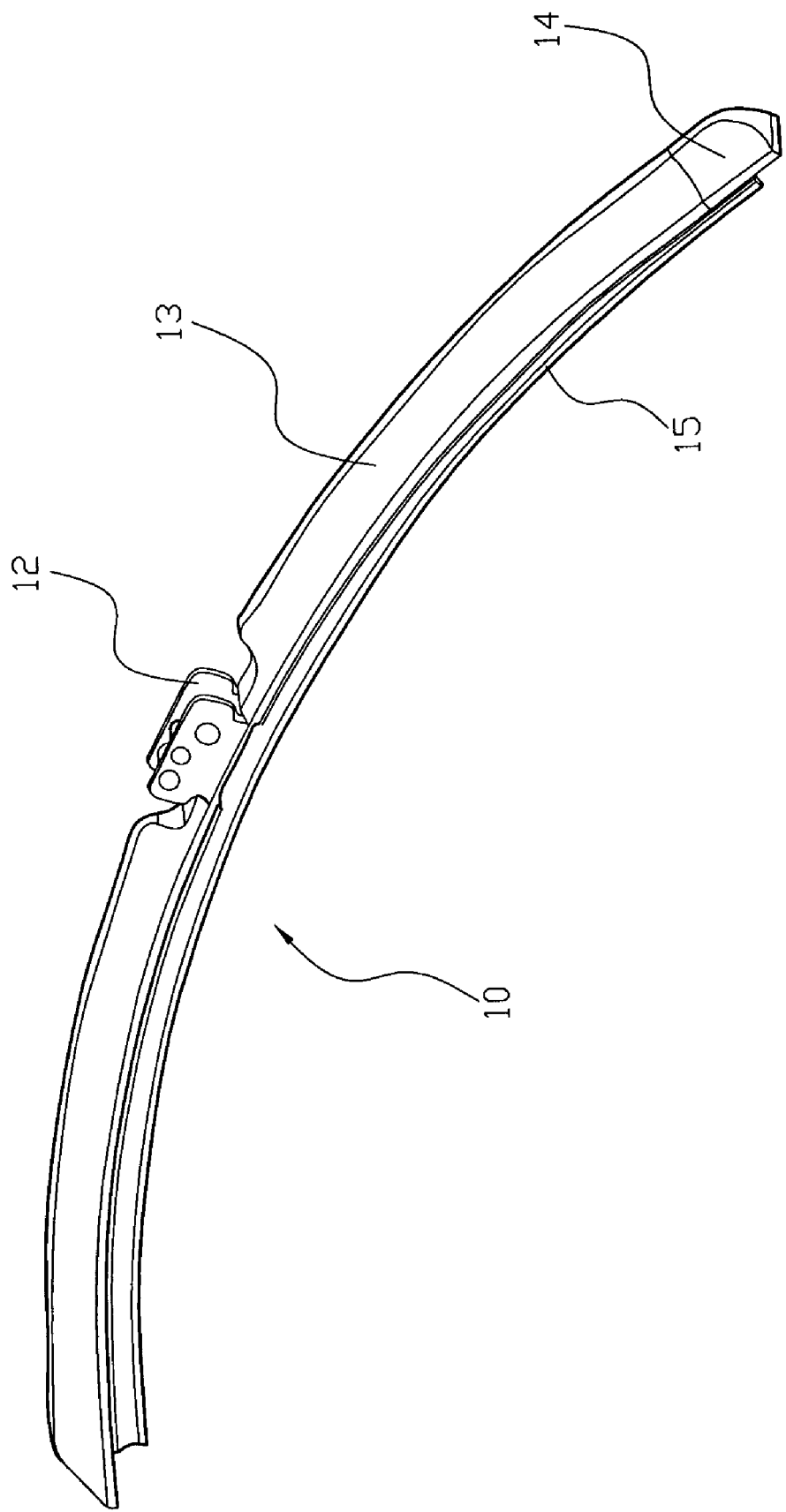
FIG. 8 is a perspective view of a conventional windshield wiper in accordance with the prior art.
Figure 9:
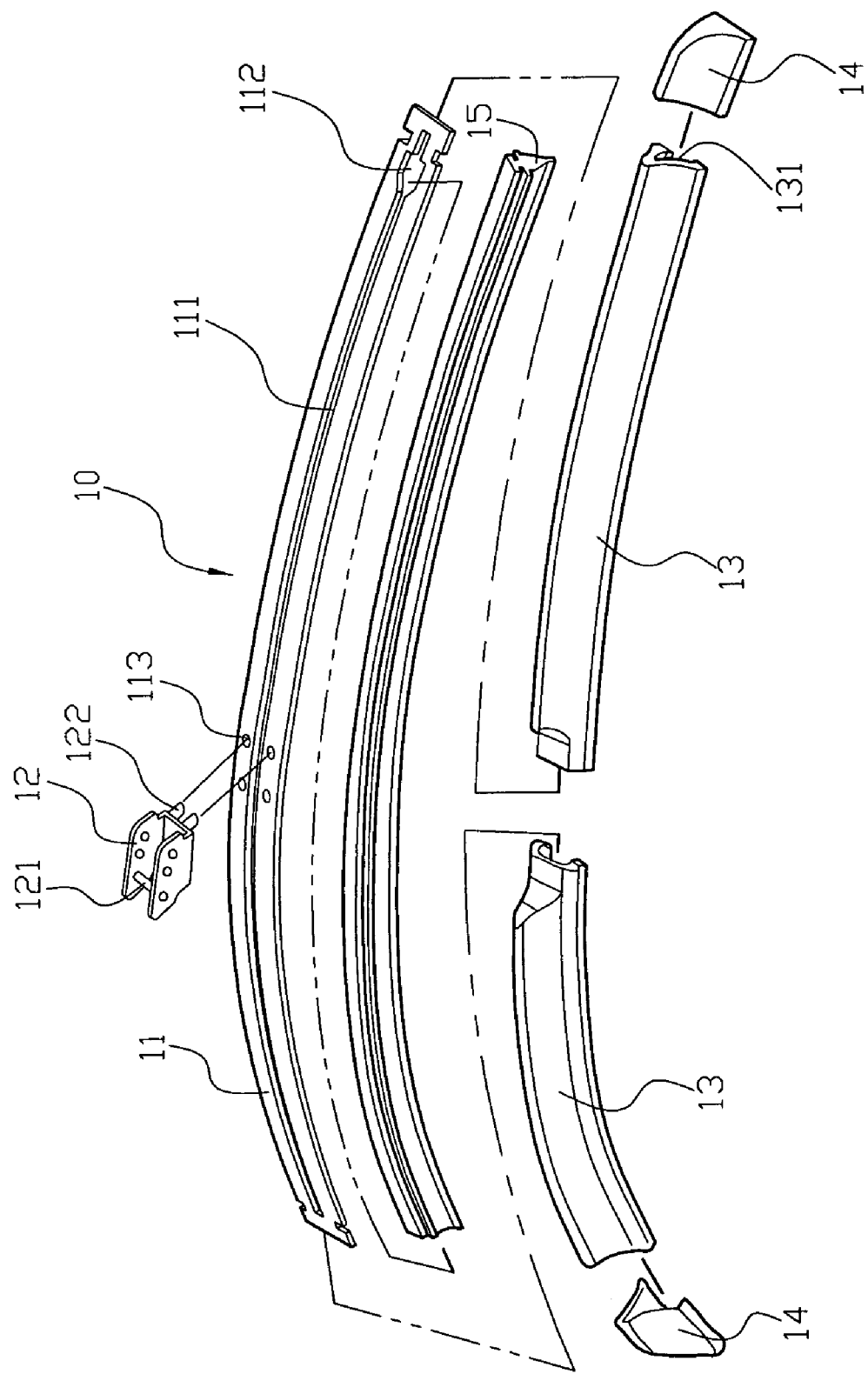
FIG. 9 is an exploded perspective view of the conventional windshield wiper as shown in FIG. 8.

Referring to the drawings and initially to FIGS. 1 and 2, a windshield wiper in accordance with the preferred embodiment of the present invention comprises a connecting seat 30, two elastic plates 20, a wiper 80, two rubber protective hoods 60, two side covers 70, a shelter 40, and a connecting block 50.

Referring to FIGS. 1-7, the connecting seat 30 has a lower portion having two sides each formed with a snapping plate 33 and a hollow upper portion provided with a pivot shaft 31. The connecting seat 30 has a periphery formed with two locking grooves 32 each located above the respective snapping plate 33. The snapping plate 33 of the connecting seat 30 is substantially inverted L-shaped and has an inner side having a mediate portion formed with a locking block 34. The connecting seat 30 has a bottom having two sides each formed with at least one insertion block 35 (preferably two insertion blocks 35) spaced from the locking block 34.

Each of the two elastic plates 20 is substantially arc-shaped and is inserted into the respective snapping plate 33 of the connecting seat 30 in an inclined sliding manner. Each of the two elastic plates 20 is mounted in the respective snapping plate 33 of the connecting seat 30 and has a mediate portion having a first side formed with a locking recess 22 for mounting the locking block 34 of the respective snapping plate 33 of the connecting seat 30 and a second side formed with at least one insertion recess 23 (preferably two insertion recesses 23) to allow insertion of the at least one insertion block 35 of the connecting seat 30. Each of the two elastic plates 20 has two ends each formed with a locking hole 21.

The wiper 80 is mounted between the two elastic plates 20. The wiper 80 is inserted into a gap 25 between the two elastic plates 20 in a sliding manner to push each of the two elastic plates 20 toward the respective snapping plate 33 of the connecting seat 30 so that each of the two elastic plates 20 is secured in the connecting seat 30 closely, and the wiper 80 is clamped between the two elastic plates 20 closely.

Each of the two rubber protective hoods 60 is mounted on the wiper 80 and rested on the two elastic plates 20. Each of the two rubber protective hoods 60 is slidable on one of two ends of the wiper 80 and has a bottom formed with an opening 61 mounted on the wiper 80.

Each of the two side covers 70 is mounted on the two elastic plates 20 and rested on a respective one of the two rubber protective hoods 60. Each of the two side covers 70 is mounted on one of two ends of each of the two elastic plates 20 and has a bottom formed with two locking posts 71 each inserted into and locked in the locking hole 21 of each of the two elastic plates 20 so that each of the two side covers 70 is mounted on the two elastic plates 20 closely.

The shelter 40 is a hollow body mounted around the periphery the connecting seat 30 and has an inside formed with two locking protrusions 41 each locked in the respective locking groove 32 of the connecting seat 30.

The connecting block 50 is pivotally mounted in the connecting seat 30 and located between the two rubber protective hoods 60. The connecting block 50 has a lower portion formed with a pivot slot 53 pivotally mounted on the pivot shaft 31 of the connecting seat 30 and an upper portion formed with a mounting recess 54 for mounting a motor (not shown) which is used to drive the windshield wiper.

Accordingly, each of the two elastic plates 20 is snapped into the respective snapping plate 33 of the connecting seat 30 so that each of the two elastic plates 20 is mounted in the connecting seat 30 in a snapping manner without needing the riveting process, thereby greatly facilitating assembly of the windshield wiper and saving the manual work. In addition, each of the two side covers 70 has two locking posts 71 each inserted into and locked in the locking hole 21 of each of the two elastic plates 20 so that each of the two side covers 70 is mounted on the two elastic plates 20 closely without needing an adhesive or a bonding action, thereby simplifying the manufacturing process, and enhancing the productivity of the windshield wiper. Further, each of the two side covers 70 is positioned on the two elastic plates 20 exactly, thereby preventing each of the two side covers 70 from being detached from the two elastic plates 20 during a long-term utilization.

Further, the shelter 40 is mounted around the periphery the connecting seat 30 to enhance the aesthetic quality of the windshield wiper.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A windshield wiper assembly, comprising a connecting seat, two elastic plates, and a wiper, wherein:
   the connecting seat has a lower portion having two sides each formed with a snapping plate having an inner side having a mediate portion formed with a locking block;
   the connecting seat has a bottom having two sides each formed with at least one insertion block spaced from the locking block;
   each of the two elastic plates is mounted in the respective snapping plate of the connecting seat and has a mediate portion having a first side formed with a locking recess for mounting the locking block of the respective snapping plate of the connecting seat and a second side formed with at least one insertion recess to allow insertion of the at least one insertion block of the connecting seat;
   the wiper is mounted between the two elastic plates.

2. The windshield wiper assembly in accordance with claim 1, wherein the snapping plate of each of the two sides of the lower portion of the connecting seat is substantially inverted L-shaped.

3. The windshield wiper assembly in accordance with claim 1, wherein each of the two elastic plates is substantially arc-shaped.

4. The windshield wiper assembly in accordance with claim 1, wherein each of the two elastic plates is inserted into the respective snapping plate of the connecting seat in an inclined sliding manner.

5. The windshield wiper assembly in accordance with claim 1, wherein the wiper is inserted into a gap between the two elastic plates in a sliding manner to push each of the two elastic plates toward the respective snapping plate of the connecting seat so that each of the two elastic plates is secured in the connecting seat closely, and the wiper is clamped between the two elastic plates closely.

6. The windshield wiper assembly in accordance with claim 1, further comprising two rubber protective hoods each mounted on the wiper and rested on the two elastic plates.

7. The windshield wiper assembly in accordance with claim 6, wherein each of the two rubber protective hoods is slidable on one of two ends of the wiper.

8. The windshield wiper assembly in accordance with claim 6, wherein each of the two rubber protective hoods has a bottom formed with an opening mounted on the wiper.

9. The windshield wiper assembly in accordance with claim 1, further comprising two side covers each mounted on the two elastic plates and rested on a respective one of the two rubber protective hoods.

10. The windshield wiper assembly in accordance with claim 9, wherein each of the two elastic plates has two ends each formed with a locking hole, and each of the two side covers is mounted on one of two ends of each of the two elastic plates and has a bottom formed with two locking posts each inserted into and locked in the locking hole of each of the two elastic plates so that each of the two side covers is mounted on the two elastic plates closely.

11. The windshield wiper assembly in accordance with claim 1, further comprising a shelter mounted around a periphery the connecting seat.

12. The windshield wiper assembly in accordance with claim 11, wherein the periphery of the connecting seat is formed with two locking grooves each located above the respective snapping plate, and the shelter has an inside formed with two locking protrusions each locked in the respective locking groove of the connecting seat.

13. The windshield wiper assembly in accordance with claim 11, wherein the shelter is a hollow body.

14. The windshield wiper assembly in accordance with claim 1, further comprising a connecting block pivotally mounted in the connecting seat.

15. The windshield wiper assembly in accordance with claim 14, wherein the connecting seat has a hollow upper portion provided with a pivot shaft, and the connecting block has a lower portion formed with a pivot slot pivotally mounted on the pivot shaft of the connecting seat.

16. The windshield wiper assembly in accordance with claim 14, wherein the connecting block has an upper portion formed with a mounting recess.

\* \* \* \* \*